United States Patent [19]
Sherman

[11] Patent Number: 5,402,130
[45] Date of Patent: Mar. 28, 1995

[54] MONOPULSE PROCESSOR

[75] Inventor: Samuel M. Sherman, Morrestown, N.J.

[73] Assignee: Martin Marietta Corporation, Morrestown, N.J.

[21] Appl. No.: 268,051

[22] Filed: May 28, 1981

[51] Int. Cl.6 ............................................. G01S 13/44
[52] U.S. Cl. ................................. 342/152; 342/80; 342/194
[58] Field of Search ................................. 343/16 M

[56]  References Cited
U.S. PATENT DOCUMENTS

| | | | |
|---|---|---|---|
| 3,378,843 | 4/1968 | Sherman | 343/16 M |
| 3,958,242 | 5/1976 | Sirven | 343/16 M X |
| 4,011,564 | 3/1977 | Gulick, Jr. | 343/16 M |
| 4,064,510 | 12/1977 | Chabah | 343/16 M X |
| 4,103,300 | 7/1978 | Gendreu et al. | 343/16 M X |
| 4,139,850 | 2/1979 | Charlot et al. | 343/16 M |
| 4,296,415 | 10/1981 | Pelton et al. | 342/152 |

OTHER PUBLICATIONS

D. K. Barton, "Low-Angle Radar Tracking", *Proceedings of the IEEE*, Jun. 1974, pp. 687-704.

*Primary Examiner*—Ian J. Lobo
*Attorney, Agent, or Firm*—W. H. Meise; C. A. Nieves; S. A. Young

[57]  ABSTRACT

In a monopulse radar processor, the usual sum (s) and difference (d) signals are manipulated to produce two other signals (s+ad and s+bd, in which a and b are constants). The phase of each of these derived signals with respect to the sum signal is then determined. The real part of d/s and, if desired, the imaginary part of d/s are calculated from these measured phase angles. The real part of d/s is the conventional output from a monopulse processor.

11 Claims, 6 Drawing Sheets

MONOPULSE PROCESSOR

This invention relates to the field of signal processing and, more particularly, to the field of monopulse signal processing.

During reception a conventional monopulse antenna generates a difference signal for each of its coordinates (elevation and traverse), and a sum signal. These signals are processed to determine the degree to which and the direction in which the target or source is off the axis of the beam. The term target will be used herein to refer both to targets which reflect a transmitted signal as in radar and to sources which radiate their own signals. Conventional monopulse processing is restricted to use with systems which maintain continuous track of a single target. With the advent of agile beam radars which maintain multiple interleaved target tracks or in which tracking pulses are interleaved with search pulses, a technique was needed which would allow monopulse processing of radar signals which jumped from target to target or alternated between track and search. A form of processing known as $\Sigma + j\Delta$ processing was introduced to fill this need. $\Sigma$ is the symbol used for the sum signal and $\Delta$ is the symbol used for the difference signal in either coordinate. This type of processing is effective in the clear, but has been found to produce undesirable increased errors in the presence of unresolved targets, jamming, interference and multipath signals.

A monopulse processor is needed which is not unduly complicated, is effective with agile beam radars and which has the same low error as conventional monopulse processing.

In accordance with a preferred embodiment of the present invention the problems of the prior art are overcome by forming two different signals from the sum signal and the difference signal in a given coordinate, then measuring the phase of each of these derived signals with respect to the sum signal and calculating from these measured phase angles an output from which the position of the target is determined in that coordinate with the same low error as with conventional monopulse processing in the same environment, even in the presence of unresolved targets, interference, jamming and multipath signals. A complete system preferably provides a difference signal in each of two coordinates and provides a target position signal in each of these coordinates.

Figure 1:
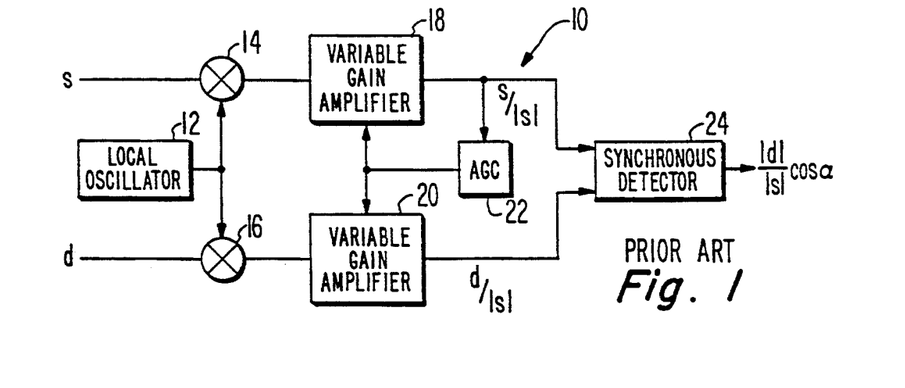
FIGS. 1-3 illustrate in block diagram form three prior art monopulse radar processing schemes.

A prior art monopulse processor 10 illustrated in FIG. 1 for one angular coordinate (the other coordinate being processed in the same way) includes a local oscillator 12 whose output is fed to two mixers 14 and 16 which also receive the sum ($\Sigma$) and difference ($\Delta$) signals respectively from a monopulse antenna. Hereinafter for simplicity, the symbol "s" will be used for the sum signal and the symbol "d" will be used for the difference signal. The symbols s and d as used herein represent phasors—that is, complex numbers that indicate the amplitude and phase of the respective signals. The output signal from sum mixer 14 is fed to a variable gain amplifier 18 whose output signal is fed to an automatic gain control (AGC) system 22 and to a synchronous detector 24. The output of the difference mixer 16 is fed to a variable gain amplifier 20 whose output is fed to the synchronous detector 24. The AGC system 22 has its output connected to simultaneously adjust the variable gain of both amplifiers to be equal to $1/|s|$ (the reciprocal of the magnitude of the sum signal) in order that the inputs to synchronous detector 24 may be $s/|s|$ and $d/|s|$. The process of dividing both the s and d signals by $|s|$ is called normalization and is necessary for proper processing in the synchronous detector. The synchronous detection of these two signals yields an output signal equal to:

$$\frac{|d|\cos\alpha}{|s|}, \qquad \text{Eq. 1}$$

where $\alpha = \alpha_d - \alpha_s$ and $\alpha_d$ is the phase angle of the difference signal and $\alpha_s$ is the phase angle of the sum signal. The output $$\frac{|d|\cos\alpha}{|s|}$$

is the conventional output for a monopulse processor.

Figure 6:
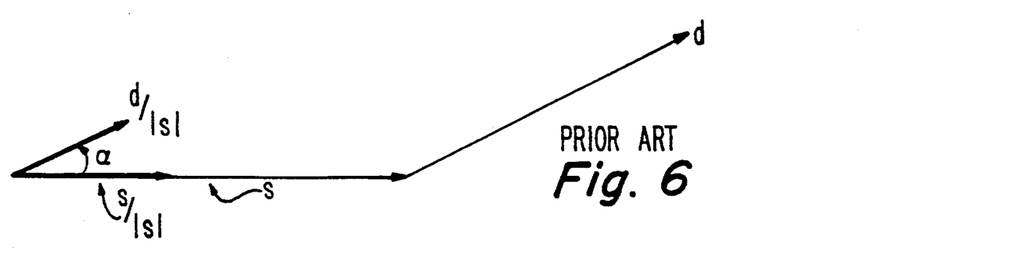
FIGS. 6-11 illustrate via vector manipulations various aspects of the monopulse processing schemes of the systems of FIGS. 1-5.

The processing of the d and s signals in this processor prior to synchronous detector 24 is illustrated in vector form in FIG. 6. The vectors d and s are normalized (divided) by $|s|$, but their relative phase angle is unchanged.

In general $d \equiv |d|\exp(j\alpha_d)$ and $s \equiv |s|\exp(j\alpha_s)$. Then $d/s = (|d|/|s|)\exp(j\alpha_d - j\alpha_s) = (|d|/|s|)\exp(j\alpha) = (|d|/|s|)(\cos\alpha + j\sin\alpha)$. Herin j is the square root of $-1$. Hence the real part of d/s is:

$$Re(d/s) = \frac{|d|}{|s|}\cos\alpha, \text{ and} \qquad \text{Eq. 2}$$

the imaginary part of d/s is:

$$Im(d/s) = \frac{|d|}{|s|}\sin\alpha. \qquad \text{Eq. 3}$$

Monopulse systems are typically designed so that when operating in the clear with a single target within the main beam, the relative phase between d and s is 0° if the target is on a first side of the axis in that coordinate and 180° if the target is on the other side of the axis in that coordinate. Thus, in the clear within the main beam $\cos\alpha$ is $\pm 1$ and $\sin\alpha$ is 0. Thus, d/s has only a real part and this is the value provided by this monopulse processor as its output signal. Thus, the conventional output of a monopulse processor is the real part of d/s.

The processing system 10 of FIG. 1 is known as a conventional monopulse processor using AGC for normalization. Statistical techniques independent of the implementation of this system have shown that this conventional monopulse processing yields errors due to thermal noise which approach the theoretical minimum error. This type of system was initially developed for, and is still used in, tracking radars which maintain a continuous track on a single target. The output from the monopulse processor indicates the direction in which the target is off the beam axis of the antenna by the sign of the output and indicates the distance off axis by the value of the output.

AGC monopulse processing cannot be used with agile beam radars which maintain interleaved tracks or interleaved tracks and searches, since the AGC system would not operate properly in that environment where successive signals are not from the same target.

Figure 2:
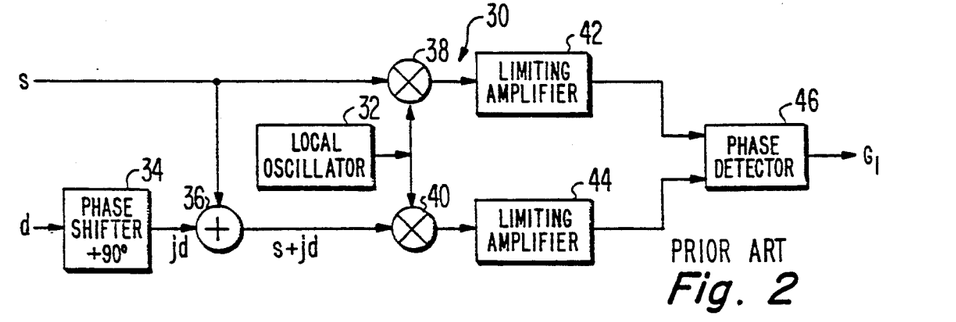

The prior art monopulse processor 30 of FIG. 2 is designed to eliminate the need for the AGC system 22 of processor 10 in order that the processor 30 may be utilized with agile beam radars. In system 30, a phase shifter 34 receives the difference signal from the antenna and phase shifts it forward by 90° to form the signal jd, where j is the +90° phase shift operator. The output from phase shifter 34 is fed to a first input of a combiner 36 whose second input is connected to the sum terminal of the antenna. Combiner 36 is a microwave hybrid whose instantaneous output signal is the algebraic sum of the instantaneous signed amplitudes of its input signals. The output of the combiner 36 is a signal equal to s+jd. This signal is connected to one input of an s+jd mixer 40 whose other input is connected to the output of a local oscillator 32. A sum mixer 38 has one input connected to the sum terminal of the antenna and the other input connected to the local oscillator 32. The output of sum mixer 38 is fed to a limiting amplifier 42 whose output signal is connected to one input of a phase detector 46. The output of s+jd mixer 40 is connected to the input of a limiting amplifier 44 whose output is connected to the other input of phase detector 46. The output from the phase detector 46 is a signal proportional to the phase difference between the s and the s+jd signals and indicates that that phase difference is equal to an angle $G_1$.

Figure 7:
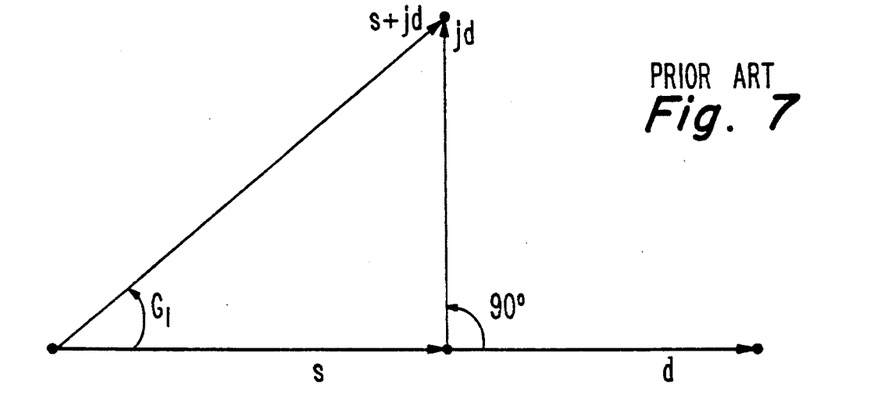

The processing performed by processor 30 of FIG. 2 is illustrated in vector form in FIG. 7 for the situation where the system is operating in the clear. In that situation, the s and d signals are in phase for a target on one side of the antenna axis. The d signal is rotated 90° to obtain the jd signal and the s and jd signals are summed to yield the signal s+jd. The angle $G_1$ is the angle between the vector s and the vector s+jd. For purposes of comparison with processor 10 of FIG. 1, it is convenient to regard the tangent of angle $G_1$ rather than angle $G_1$ itself as the output of processor 30 of FIG. 2. (The tangent is easily computed once the angle $G_1$ has been measured.) The tangent of angle $G_1$ is $|d|/|s|$. Thus, in the clear the processor of FIG. 2 provides the same output as the processor of FIG. 1, since $\cos\alpha = 1$ in this situation. However, in the presence of interference, jamming, or multipath signal return, the sum and difference signals are no longer in phase and the outputs of the processors of FIG. 1 and FIG. 2 are not equal. It is known and will be illustrated that the s+jd processor develops greater errors than the processor 10 of FIG. 1. In a variant but equivalent form of processor 30 of FIG. 2 the phase shift produced by phase shifter 34 is −90° instead of +90° and therefore the output of combiner 36 is s−jd instead of s+jd. The result is an output $G_2$ (the phase angle between s and s−jd). When operating in the clear, $G_1 = G_2$ and the final result is identical.

Hence, in the clear the choice of the positive or negative sign of the phase shift is immaterial.

Figure 3:
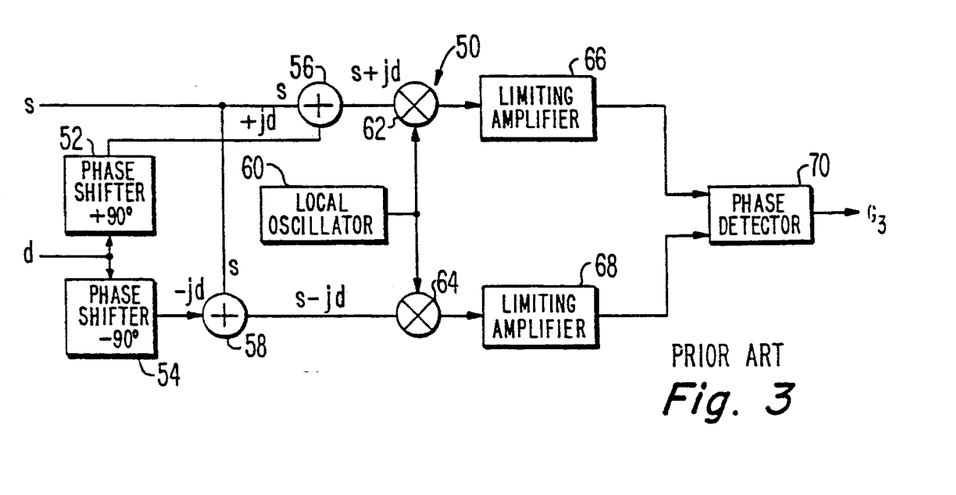

Another form of prior art processor (50) is illustrated in FIG. 3. Processor 50 comprises two phase shifters 52 and 54 which induce separate +90° and −90°, respectively, phase shifts in the d signal, thus producing output signals jd and −jd. Two combiners 56 and 58 combine the s signal with these signals thereby forming the signals s+jd and s−jd, respectively. These signals are combined with the signal from a local oscillator 60 in mixers 62 and 64, respectively. The output signals from mixers 62 and 64 are supplied as input signals to limiting amplifiers 66 and 68, respectively. The outputs from these amplifiers are supplied as inputs to a phase detector 70 whose output is a signal representative of the phase angle $G_3$ between the s+jd and the s−jd signals. This is illustrated in vector form in FIG. 8. When operating in the clear as indicated, $G_3 = 2G_1$; however, when not in the clear $G_3 \neq 2G_1$.

Figure 4:
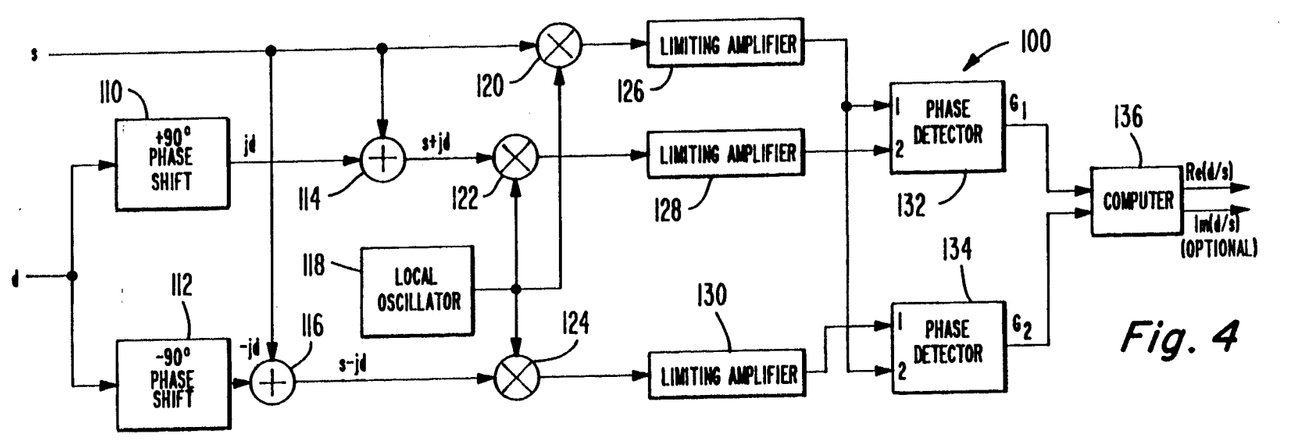
FIG. 4 is a block diagram of a preferred monopulse processor in accordance with this invention.

A preferred monopulse processor 100 in accordance with the present invention is illustrated in FIG. 4 in block diagram form. This processor is useful with monopulse systems in general, and is particularly useful with monopulse radar. In this processor, the difference signal is fed to first and second phase shifters 110 and 112 which induce +90° and −90° phase shifts, respectively, to form the signals jd and −jd. The outputs of the phase shifters are provided as first inputs to two combiners 114 and 116. The sum signal is provided as the second input of each of the combiners. The combiners 114 and 116 may be like those used in prior art systems. Each is preferably a microwave hybrid which, for example, amplitude sums its two input signals to produce its output signal. The outputs from the combiners 114 and 116 are signals equal to s+jd and s−jd, respectively. A local oscillator 118 provides its output signal to three mixers, a "sum" mixer 120, an s+jd mixer 122 and an s−jd mixer 124. The output from each of these mixers is at base-band. The signal levels of the difference signals applied to the combiners are adjusted to have the same ratio to the received difference signal as the sum signals applied to the combiners have to the received sum signal in order to provide output signals proportional to s+jd and s−jd. The other input to sum mixer 120 is connected to the sum terminal of the antenna. The output of the mixer 120 is fed to a "sum" amplitude limiting, phase retaining amplifier 126. The s+jd mixer 122 has its second input connected to receive the s+jd signal from combiner 114 and has its output connected to an s+jd limiting amplifier 128. The s−jd mixer 124 has its second input connected to receive the s−jd signal from combiner 116 and has its output connected to an s−jd limiting amplifier 130.

The output of the "sum" limiting amplifier 126 is provided as the first input to a phase detector 132 and as the second input to a phase detector 134. Phase detectors 132 and 134 may be like the phase detectors in prior art systems and produce output signals proportional to the phase angle between the signals applied thereto. The output of the s+jd limiting amplifier 128 is provided as the second input to the first phase detector 132. The output of the s−jd limiting amplifier 130 is provided as the first input to the second phase detector 134. The output of the phase detector 132 is a signal representative of the phase angle $G_1$ between the s and the s+jd signals. The output of the phase detector 134 is a signal representative of the phase angle $G_2$ between the s−jd and the s signals. These two phase angles are provided as inputs to a computer 136. This processing is illustrated in vector form in FIG. 9.

In order to provide the conventional monopulse processor output, an output must be provided which is equal to Re(d/s) or $(|d|/|s|)\cos\alpha$. A method of calculating this output will now be derived. From FIG. 9, $$\tan G_1 = \frac{|d|\cos\alpha}{|s| - |d|\sin\alpha} \qquad \text{Eq. 4}$$

Dividing both the numerator and denominator of the fraction in Equation 4 by $|s|$ yields:

$$\tan G_1 = \frac{(|d|/|s|)\cos\alpha}{1 - (|d|/|s|)\sin\alpha} \qquad \text{Eq. 5}$$

Substituting Equations 2 and 3 into Equation 5 yields:

$$\tan G_1 = \frac{Re(d/s)}{1 - Im(d/s)} \qquad \text{Eq. 6}$$

Figure 9:
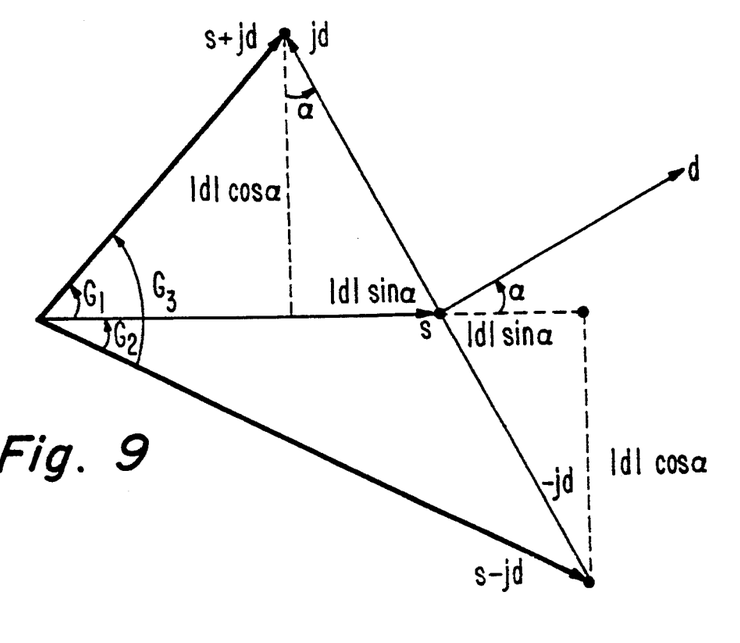

Similarly, from FIG. 9, $$\tan G_2 = \frac{|d|\cos\alpha}{|s| + |d|\sin\alpha} \qquad \text{Eq. 7}$$

Dividing the numerator and denominator by $|s|$ yields:

$$\tan G_2 = \frac{(|d|/|s|)\cos\alpha}{1 + (|d|/|s|)\sin\alpha} \qquad \text{Eq. 8}$$

Substituting Equations 2 and 3 into Equation 8 yields:

$$\tan G_2 = \frac{Re(d/s)}{1 + Im(d/s)} \qquad \text{Eq. 9}$$

Solving Equations 6 and 9 simultaneously for Re(d/s) yields:

$$Re(d/s) = \frac{2 \tan G_1 \tan G_2}{\tan G_1 + \tan G_2} = \frac{2}{\cot G_1 + \cot G_2} \qquad \text{Eq. 10}$$

Solving Equations 6 and 9 simultaneously for Im(d/s) yields:

$$Im(d/s) = \frac{\tan G_1 - \tan G_2}{\tan G_1 + \tan G_2} = \frac{\cot G_2 - \cot G_1}{\cot G_2 + \cot G_1} \qquad \text{Eq. 11}$$

Computer 136 preferably calculates Re(d/s) from the tangents of $G_1$ and $G_2$ according to Equation 10. Thus, this processor can provide an output from computer 136 which is equal to the conventional output from a monopulse processor. Any appropriate system may be used as computer 136. However, it is preferred to use a digital computer.

In each of the Equations 10 and 11, either the tangent or cotangent form may be used. If either of the phase angles $G_1$ or $G_2$ is near 0°, 90°, 180° or 270°, then the form of the equation which does not involve unduly large numbers is utilized. In the event that one of the angles is near 90° or 270° and the other is near 0° or 180° so that both forms of the equation involve unduly large numbers, a special form of the equation may be substituted by considering the unduly large term in one of the equations dominant in the denominator with the other term being ignored in the denominator as being insignificant. In the uncommon situation where both angles are zero (when $\alpha \pm 90°$) both sets of equations for Re(d/s) and Im(d/s) become indeterminate. In that situation, the processor can be structured to automatically provide the conventional monopulse output for $\alpha = 90°$ (that is, $(|d|/|s|)$ cos 90°) which is zero because cos 90°=0.

Figure 8:
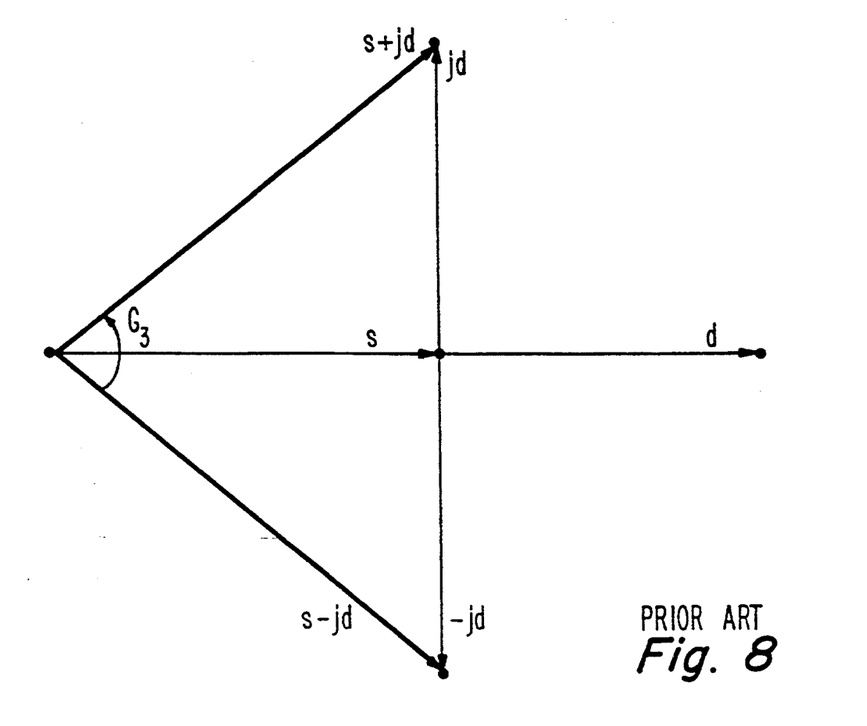

From FIG. 9 it will be noted that $G_3 = G_1 + G_2$. However, the angle $G_3$, produced by the prior-art processor 50 of FIG. 3 and represented in vector form in FIG. 8, is only useful for obtaining the conventional monopulse output when the system is operating in the clear, whereas the separate measurement of the angles $G_1$ and $G_2$ yields the ability to determine a conventional monopulse output under all conditions.

Figure 5:
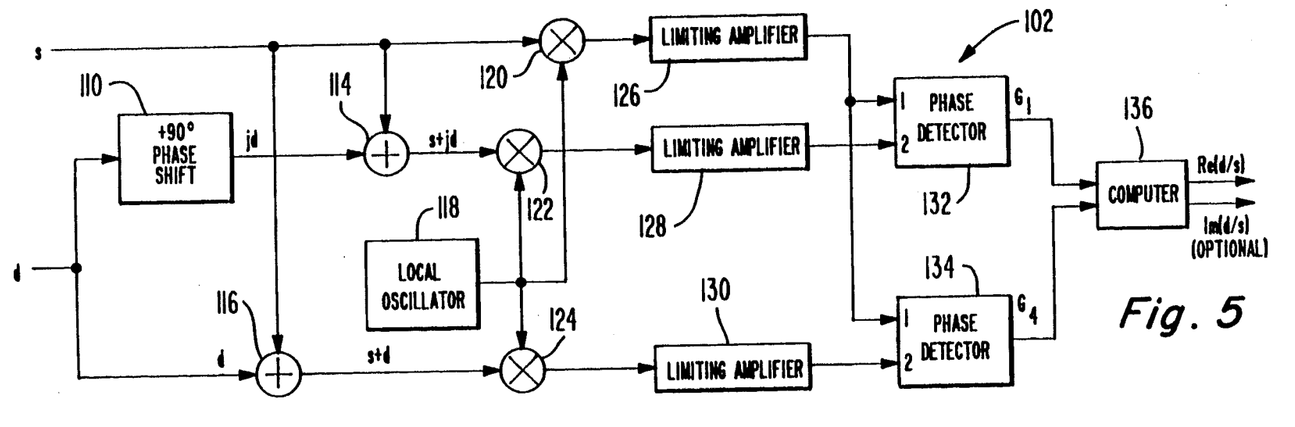
FIG. 5 illustrates an alternative monopulse processor in accordance with the invention.
Figure 10:
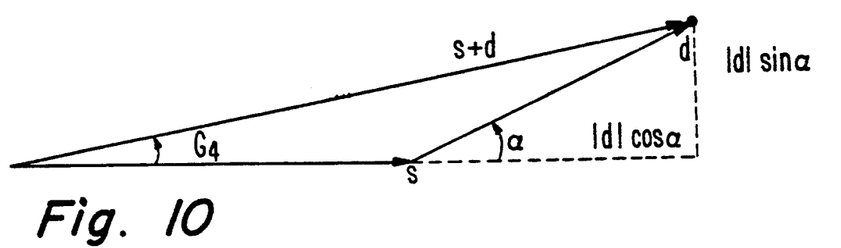

An alternative embodiment 102 of the monopulse processor of FIG. 4 is illustrated in FIG. 5. The processor 102 is identical to the processor 100 with the exception of the absence of the phase shifter 112. This difference results in the formation of a signal equal to s+d at the output of combiner 114 instead of a signal equal to s−jd. As a result, the second phase detector 134 provides an output signal representative of the phase angle $G_4$ between the s signal and the s+d signal, as illustrated in FIG. 10. Again, from FIG. 10, the tangent of the angle $G_4$ can be expressed in terms of $|d|$, $|s|$, $\sin\alpha$ and $\cos\alpha$ and a derivation similar to the derivation of Equations 10 and 11 yields the following results. The real part of d/s is:

$$Re(d/s) = \frac{\tan G_1 (1 - \tan G_4)}{1 + \tan G_1 \tan G_4} \qquad \text{Eq. 12}$$

and the imaginary part of d/s is:

$$Im(d/s) = \frac{\tan G_4 (1 + \tan G_1)}{1 + \tan G_1 \tan G_4} \qquad \text{Eq. 13}$$

Both of these equations may be placed in cotangent form if desired.

Figure 11:
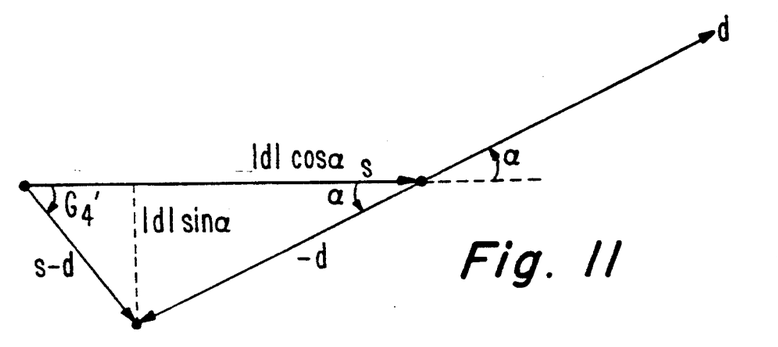

The vector relationships yielding an s−d vector (and a phase angle $G_4'$ with the s signal) are illustrated in FIG. 11. Equations for Re(d/s) can be derived using this signal with one of the other three signals described above. Thus, s+jd vs. s may be used in combination with s−d vs. s; and s−jd vs. s can be used in combination with either s+d vs. s or s−d vs. s. Although the vector diagrams suggest the possibility of using s+d vs. s in combination with s−d vs. s, this is not preferred because it leads to equations which are indeterminate when operating in the common situation of being in the clear (with s and d in phase or 180° out of phase in accordance with which side of the beam axis the target is on).

Since each of the processors 100 and 102 expresses the real part of d/s in exact terms and the imaginary part of d/s in exact terms, they have the same error as the conventional processor 10 of FIG. 1 and provide additional information in the form of Ira(d/s). Consequently, these processors provide the position of the target relative to the beam axis with the conventional monopulse error. In addition to reducing errors directly, this invention puts the monopulse outputs into a form that makes possible the application of special post-processing techniques for further reduction of errors due to multipath and unresolved targets. A list of such techniques can be found, for example, in the paper "Low-Angle Radar Tracking," by D. K. Barton, *Proceedings of the IEEE*, June 1974, pages 687–704. Most of these techniques need only the real part of d/s, but others need both the real and the imaginary parts. An example of the latter type is Complex-Angle Monopulse, described in my U.S. Pat. No. 3,378,843, and incorporated herein by reference.

Figure 12:
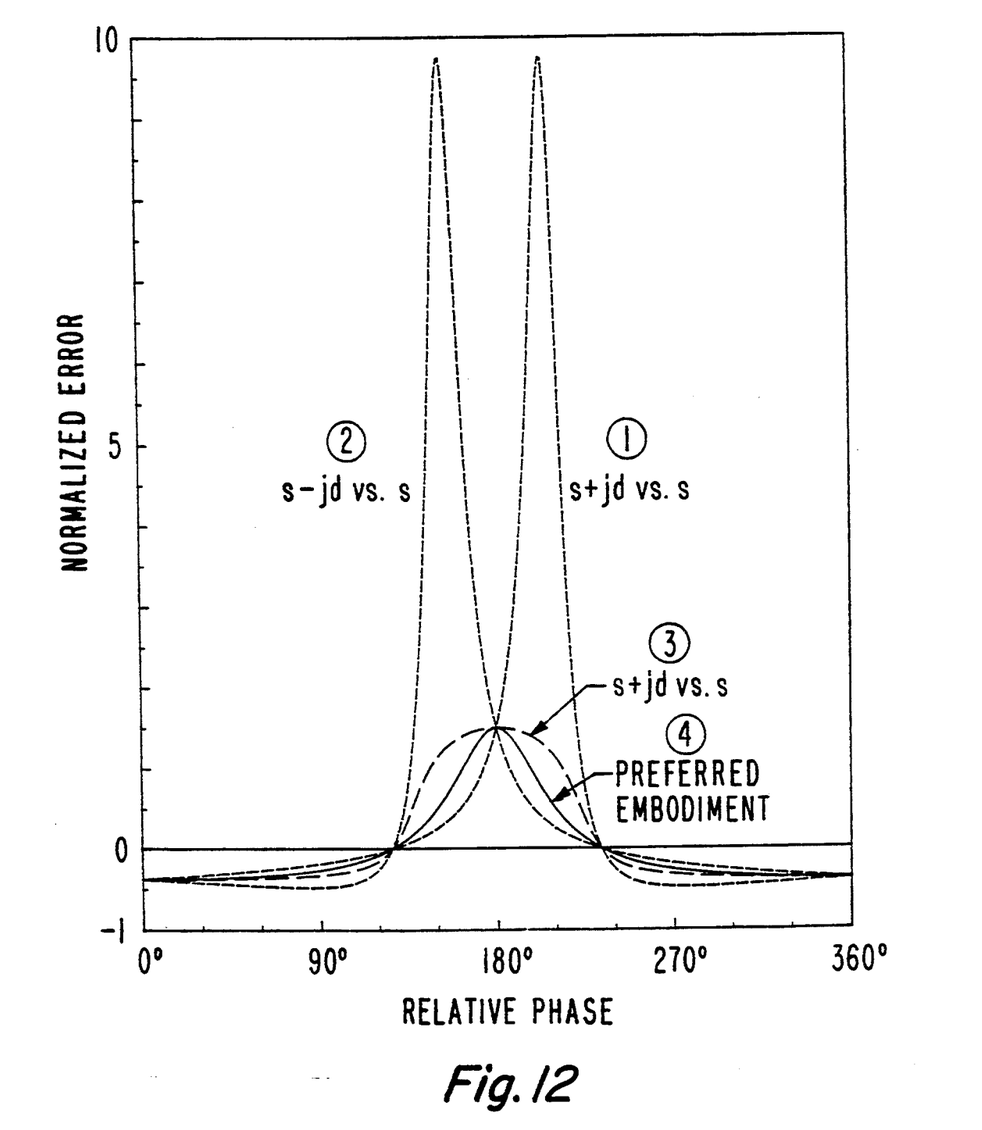
FIG. 12 is a graph illustrating the normalized error for different monopulse processing systems.

FIG. 12 is an illustrative set of plots of errors in determining the angle of a desired target due to the presence of an undesired target in the same resolution cell. The undesired target may be an independent target or an image of the desired target which results from multipath signals. The different curves are for different methods of processing. For this illustration the desired target is assumed to be on axis and an interfering unresolved target is assumed to be off axis by some negative angle smaller than a beamwidth. The voltage contribution of the interfering target in the sum channel is assumed to be 6/10 of the voltage contribution of the desired target. The abscissa of the curves is the relative phase angle of the signals from the two targets and the ordinate is the angular error normalized to (divided by) the angular separation between the two targets.

Curve 1 is for a prior art s+jd vs. s processor (FIG. 2). Curve 2 is for a prior art s−jd vs. s processor (like FIG. 2 with the sign of the 90° phase shift reversed). Curve 3 is for a prior art s+jd vs. s−jd processor (FIG 3). Curve 4 is for the preferred embodiment of this invention (s+ad vs. s together with s+bd vs. s, where a≠b, and a and b are selected from j, −j, 1 and −1 and at least one of $a^2$ or $b^2$ is −1; FIGS. 4 and 5) and is the same as the curve for a conventional monopulse output. The values j, −j, 1 and −1 for a and b correspond to phase shifts of the difference signal of +90°, −90°, 0° and 180°, respectively.

Although the s+jd vs. s (or s−jd vs. s) curve shows a smaller error than the "preferred embodiment" curve (which is identical to the curve for a conventional processor) for values of the relative phase less (greater) than 180°, this advantage is more than offset by the much larger error in the other half of the curve. Since the relative phase of the signals from the two targets is unknown, the root-mean-square (RMS) value of the error in the derived angle output over all values of relative phase is used to compare errors. It has been confirmed by computation that this RMS value of the s+jd vs. s (or s−jd vs. s) error is larger than that of a conventional monopulse processor.

The error of the s+jd vs. s−jd processor is seen to be as large as or larger than that of the preferred embodiment at all values of relative phase. Hence its root-mean-square error is also larger. The average error (that is, the bias) over all relative phase angles is zero for curve 4 but non-zero for curves 1, 2 and 3. The errors produced by the techniques of curves 1, 2 and 3 each include a bias error which can not be eliminated by smoothing.

In the example illustrated in FIG. 12, the root-mean-square errors, normalized to (divided by) the angular separation of the two targets, are found by computation to be 1.97 for curves 1 and 2, 0.68 for curve 3, and 0.53 for curve 4. Thus in this case the preferred embodiment reduces the error by 73% compared with curves 1 and 2, and by 22% compared with curve 3. Computations have been performed also for other sets of parameters (target angles and amplitude ratio) and have verified that a similar error reduction, sometimes by even larger percentages, is achieved consistently.

In calculating and plotting the curves of FIG. 12 it has been assumed that the monopulse antenna characteristics are such that for a single target in the clear the ratio d/s is proportional to the angle of the target from the axis. This assumption usually gives a good approximation for angles within one-half beamwidth of the axis (and sometimes for even larger angles), and is frequently used in analytical modeling of monopulse performance. However, the validity of this invention does not depend upon that assumption. Computations have verified that even when the nonlinear behavior of d/s as a function of angle is taken into account, the preferred embodiment described herein has errors equal to those of a conventional processor, which in turn are smaller than those of any of the prior-art s±jd processors.

Figure 13:
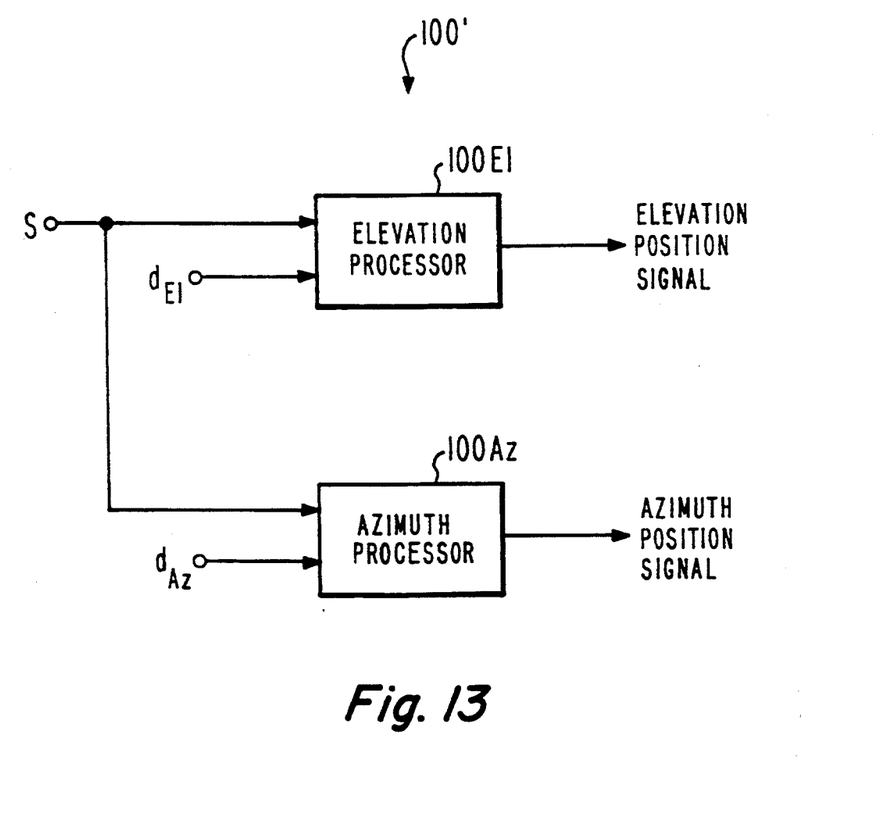
FIG. 13 is a block diagram of a monopulse processor in accordance with the invention for providing monopulse information in two coordinates.

Monopulse information may be derived in two coordinates such as elevation and azimuth by a system 100' which uses separate elevation and azimuth processors 100E1 and 100Az, respectively, for the different coordinates as illustrated in FIG. 13. Each processor receives the sum signal s. The processor 100E1 receives an elevation difference signal ($d_{E1}$) and the processor 100Az receives an azimuth difference signal ($d_{Az}$). Separate elevation and azimuth target position signals are provided by the two processors.

Monopulse processors in accordance with the present invention provide a substantial advance in the art in that they achieve the same low error everywhere as an AGC conventional monopulse processor does, and do so without requiring the presence of that processor's AGC system, thereby being directly applicable to agile beam systems.

What is claimed is:

1. In a monopulse receiver system which derives a sum signal and a first difference signal in a first coordinate on reception and which derives a target position signal from said sum and difference signals, said target position signal indicating the position of a target with respect to the receive beam axis in said first coordinate, the improvement comprising:
    means responsive to said first difference signal for providing second and third difference signals, at least one of said second and third difference signals having a different relative phase than said first difference signal and said second and third difference signals having differing relative phases;
    means for combining said sum signal and said second difference signal to provide a first combined signal;
    means for combining said sum signal and said third difference signal to provide a second combined signal;
    first phase detector means responsive to said first combined signal and said sum signal for providing a first phase angle signal representing a first relative phase angle $\Phi_1$ between said sum signal and said first combined signal;
    second phase detector means responsive to said second combined signal and said sum signal for producing a second phase angle signal representing a second relative phase angle $\Phi_2$ between said second combined signal and said sum signal; and
    processing means responsive to said first and second phase angle signals to produce a target position signal in said first coordinate.

2. The improvement recited in claim 1 wherein:
    said means responsive to said first difference signal comprises means for producing said second difference signal with a phase of +90° relative to said first difference signal and comprises means for producing said third difference signal with a phase of −90° relative to said first difference signal.

3. The improvement recited in claim 2 wherein said processing means comprises:
means for deriving a signal equal to $\cot\Phi_1$ from said first phase angle signal, for deriving a signal equal to $\cot\Phi_2$ from said second phase angle signal, and for processing said $\cot\Phi_1$ and $\cot\Phi_2$ signals to provide a signal equal to:

$$\frac{2}{\cot\phi_1 + \cot\phi_2}.$$

4. The improvement recited in claim 3 wherein said processing means comprises:
means for processing said $\cot\Phi_1$ and said $\cot\Phi_2$ signals to provide a signal equal to:

$$\frac{\cot\phi_2 - \cot\phi_1}{\cot\phi_2 + \cot\phi_1}.$$

5. The improvement recited in claim 1 wherein said means responsive to said first difference signal includes:
first means for inducing a phase shift of either +90° or −90° for producing said second difference signal with a phase of either +90° or −90° respectively, relative to said first difference signal, and
second means for inducing a phase shift off either 0° or 180° for producing said third difference signal with a phase of either 0° or 180°, respectively, relative to said first difference signal.

6. The improvement recited in claim 5 wherein:
said first phase shift means comprises means for producing said second difference signal with a phase of +90° relative to said first difference signal;
said second phase shift means comprises means for producing said third difference signal with a phase of 0° relative to said first difference signal; and
said processing means comprises means for deriving a signal equal to tan $\Phi_1$ from said first phase angle signal, for deriving a signal equal to tan $\Phi_2$ from said second phase angle signal and for processing the signals tan $\Phi_1$ and tan $\Phi_2$ to provide a signal equal to:

$$\frac{\tan\phi_1 (1 - \tan\phi_2)}{1 - \tan\phi_1 \tan\phi_2}.$$

7. The improvement recited in claim 6 wherein said processing means comprises means for processing said tan $\Phi_1$ and tan $\Phi_2$ signals to provide a signal equal to:

$$\frac{\tan\phi_2(1 + \tan\phi_1)}{1 + \tan\phi_1 \tan\phi_2}.$$

8. The improvement recited in claim 1 wherein said system also derives a difference signal in a second coordinate and said system includes:
means responsive to said second coordinate difference signal for providing fourth and fifth difference signals, at least one of said fourth and fifth difference signals having a different relative phase than said second coordinate difference signal and said fourth and fifth difference signals having differing relative phases;
means for combining said sum signal and said fourth difference signal to provide a third combined signal;
means for combining said sum signal and said fifth difference signal to provide a fourth combined signal;
third phase detector means responsive to said third combined signal and said sum signal for providing a third phase angle signal representing a third relative phase angle $\Phi_3$ between said sum signal and said third combined signal;
fourth phase detector means responsive to said fourth combined signal and said sum signal for producing a fourth phase angle signal representing a fourth relative phase angle $\Phi_4$ between said fourth combined signal and said sum signal; and
said processing means responsive to said third and fourth phase angle signals to produce a target position signal in said second coordinate.

9. A method of deriving target position information from the sum and a first difference signal in a monopulse receiver system, said method comprising:
equally power dividing said first difference signal to produce intermediate difference signals;
forming a second difference signal from one of said intermediate difference signals by phase shifting the intermediate difference signal relative to said first difference signal;
forming a third difference signal from the other intermediate difference signal, said third difference signal having a different relative phase than said second difference signal;
combining said sum signal and said second difference signal to form a first combined signal;
combining said sum signal and said third difference signal to form a second combined signal;
determining a first relative phase angle $\Phi_1$ between said sum signal and said first combined signal;
determining a second relative phase angle $\Phi_2$ between said second combined signal and said sum signal; and
deriving target position information from said first relative phase angle $\Phi_1$ and said second relative phase angle $\Phi_2$.

10. The method recited in claim 9 wherein said step of forming a third difference signal comprises phase shifting said other intermediate difference signal relative to said first difference signal.

11. The method recited in claim 10 wherein:
said step of forming a second difference signal comprises phase shifting said one intermediate difference signal by +90°; and
said step of forming a third difference signal comprises phase shifting said other intermediate difference signal by +90°.

* * * * *